US012586530B2

(12) United States Patent
Park et al.

(10) Patent No.: US 12,586,530 B2
(45) Date of Patent: Mar. 24, 2026

(54) PIXEL AND DISPLAY DEVICE INCLUDING THE SAME, AND ELECTRONIC DEVICE

(71) Applicant: Samsung Display Co., LTD., Yongin-si (KR)

(72) Inventors: Kyeong Min Park, Yongin-si (KR); Kyung Bae Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/965,930

(22) Filed: Dec. 2, 2024

(65) Prior Publication Data

US 2025/0265990 A1 Aug. 21, 2025

(30) Foreign Application Priority Data

Feb. 19, 2024 (KR) ........................ 10-2024-0023555

(51) Int. Cl.

*G09G 3/3233* (2016.01)
*G09G 3/32* (2016.01)
*G09G 3/3266* (2016.01)
*G09G 3/3275* (2016.01)

(52) U.S. Cl.

CPC ............. *G09G 3/3233* (2013.01); *G09G 3/32* (2013.01); *G09G 3/3266* (2013.01); *G09G 3/3275* (2013.01); *G09G 2310/0267* (2013.01); *G09G 2310/0275* (2013.01)

(58) Field of Classification Search

None
See application file for complete search history.

(56) References Cited

U.S. PATENT DOCUMENTS

| | | | | |
|---|---|---|---|---|
| 9,984,616 | B2 | 5/2018 | Wacyk | |
| 2012/0313118 | A1 | 12/2012 | Wacyk et al. | |
| 2015/0145850 | A1 * | 5/2015 | Rohatgi ................. | G09G 3/006 345/212 |
| 2024/0249669 | A1 * | 7/2024 | Lee .......................... | G09G 3/32 |

OTHER PUBLICATIONS

Behzad Razavi, "Design of Analog CMOS Integrated Circuits," McGraw-Hill, 2017, 801 pages.

* cited by examiner

*Primary Examiner* — Christopher J Kohlman
(74) *Attorney, Agent, or Firm* — CANTOR COLBURN LLP

(57) ABSTRACT

A pixel includes: a light emitting element; a first transistor including a gate electrode connected to a first node, a first electrode connected to a second node, and a second electrode connected to an anode electrode of the light emitting element; a second transistor connected between a data line and the first node, the second transistor including a gate electrode connected to a first scan line; and a third transistor connected between a first power line and the second node, the third transistor including a gate electrode connected to the second node.

19 Claims, 14 Drawing Sheets

SLi: SL1i, SL2i

SLi: SL1i, SL2i

PIXEL AND DISPLAY DEVICE INCLUDING THE SAME, AND ELECTRONIC DEVICE

This application claims priority to Korean patent application No. 10-2024-0023555, filed on Feb. 19, 2024, and all the benefits accruing therefrom under 35 U.S.C. § 119, the content of which in its entirety is herein incorporated by reference.

BACKGROUND

1. Technical Field

The present disclosure generally relates to a pixel and a display device including the same, and electronic device.

2. Related Art

With the development of information technologies, the importance of a display device which is a connection medium between a user and information increases. Accordingly, display devices such as a liquid crystal display device and an organic light emitting display device are increasingly used.

Recently, a Head Mounted Display Device ("HMD") has been developed. The HMD is a display device which a user wears in the form of glasses or a helmet, thereby implementing Virtual Reality ("VR") or Augmented Reality ("AR"), in which a focus is formed at a distance close to eyes. A high-resolution panel is applied to the HMD, and accordingly, a pixel applicable to the high-resolution panel is desirable.

SUMMARY

Embodiments provide a pixel and a display device including the same, which can be applied to a high-resolution panel.

In accordance with an aspect of the present disclosure, there is provided a pixel including: a light emitting element; a first transistor including a gate electrode connected to a first node, a first electrode connected to a second node, and a second electrode connected to an anode electrode of the light emitting element; a second transistor connected between a data line and the first node, the second transistor including a gate electrode connected to a first scan line; and a third transistor connected between a first power line and the second node, the third transistor including a gate electrode connected to the second node.

The pixel may further include a storage capacitor connected between the first power line and the first node.

The storage capacitor may be a Metal-Oxide-Metal ("MOM") capacitor, a Metal-Insulator-Metal ("MIM") capacitor, or a Metal-Oxide-Semiconductor ("MOS") capacitor.

A cathode electrode of the light emitting element may be connected to a second power line to which a second driving power source having a voltage lower than a voltage of a first driving power source is supplied.

The pixel may further include: a fourth transistor connected between the first power line and the third transistor, the fourth transistor including a gate electrode connected to an emission control line; and a fifth transistor connected between the anode electrode of the light emitting element and a third power line to which an initialization power source is supplied, the fifth transistor including a gate electrode connected to a second scan line.

Each of the first transistor, the second transistor, the third transistor, the fourth transistor, and the fifth transistor may be a P-type transistor.

A high voltage supplied to the emission control line may be different from a high voltage supplied to any of the first scan line and the second scan line.

The high voltage supplied to the emission control line may be set as a voltage lower than the high voltage supplied to any of the first scan line and the second scan line.

Each of the first transistor, the second transistor, and the fifth transistor may be a high voltage MOSFET, and each of the third transistor and the fourth transistor may be a medium voltage MOSFET.

In accordance with another aspect of the present disclosure, there is provided a display device including: pixels connected to scan lines and data lines; a scan driver configured to drive the scan lines; and a data driver configured to drive the data lines, wherein at least one pixel among the pixels includes: a light emitting element; a first transistor including a gate electrode connected to a first node, a first electrode connected to a second node, and a second electrode connected to an anode electrode of the light emitting element; a second transistor connected between the first node and a corresponding data line of the data lines, the second transistor including a gate electrode connected to a first scan line of the scan lines; and a third transistor connected between a first power line and the second node, the third transistor including a gate electrode connected to the second node.

The at least one pixel may further include a storage capacitor connected between the first power line and the first node.

The storage capacitor may be a Metal-Oxide-Metal (MOM) capacitor, a Metal-Insulator-Metal (MIM) capacitor, or a Metal-Oxide-Semiconductor (MOS) capacitor.

A cathode electrode of the light emitting element may be connected to a second power line to which a second driving power source having a voltage lower than a voltage of a first driving power source is supplied.

The display device may further include: emission control lines connected to the pixels; and an emission driver configured to drive the emission control lines. The at least one pixel may further include: a fourth transistor connected between the first power line and the third transistor, the fourth transistor including a gate electrode connected to a corresponding emission control line of the emission control lines; and a fifth transistor connected between the anode electrode of the light emitting element and a third power line to which an initialization power source is supplied, the fifth transistor including a gate electrode connected to a second scan line of the scan lines.

Each of the first transistor, the second transistor, the third transistor, the fourth transistor, and the fifth transistor may be a P-type transistor.

A high voltage supplied to the corresponding emission control line may be different from a high voltage supplied to any of the first scan line and the second scan line.

The high voltage supplied to the emission control line may be set as a voltage lower than the high voltage supplied to any of the first scan line and the second scan line.

Each of the first transistor, the second transistor, and the fifth transistor may be a high voltage MOSFET, and each of the third transistor and the fourth transistor may be a medium voltage MOSFET.

The at least one pixel may be sequentially driven in an initialization period, a writing period, a stabilization period, and an emission period. The emission driver may supply a disable emission control signal to the corresponding emission control line such that the fourth transistor is turned off during the writing period and a partial period of the stabilization period. The scan driver may supply an enable first scan signal to the first scan line such that the second transistor is turned on during the initialization period and the writing period. The scan driver may supply an enable second scan signal to the second scan line such that the fifth transistor is turned on during the initialization period, the writing period, and the stabilization period. The data driver may supply a data signal to the corresponding data line during the writing period, and supplies a voltage of a reference power source during the other periods.

The at least one pixel may be sequentially driven in an initialization period, a writing period, a stabilization period, and an emission period. The emission driver may supply a disable emission control signal to the corresponding emission control line such that the fourth transistor is turned off during the writing period and a partial period of the stabilization period. The scan driver may supply an enable first scan signal to the first scan line such that the second transistor is turned on during the initialization period and the writing period. The scan driver may supply an enable second scan signal to the second scan line such that the fifth transistor is turned on during the initialization period, the writing period, and the stabilization period. The data driver may supply a data signal to the corresponding data line during the initialization period and the writing period.

In accordance with another aspect of the present disclosure, there is provided an electronic device including: a processor to provide input image data; a display device to display an image based on the input image data, the display device including: pixels connected to scan lines and data lines; a scan driver configured to drive the scan lines; and a data driver configured to drive the data lines, wherein at least one pixel among the pixels includes: a light emitting element; a first transistor including a gate electrode connected to a first node, a first electrode connected to a second node, and a second electrode connected to an anode electrode of the light emitting element; a second transistor connected between the first node and a corresponding data line of the data lines, the second transistor including a gate electrode connected to a first scan line of the scan lines; and a third transistor connected between a first power line and the second node, the third transistor including a gate electrode connected to the second node.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
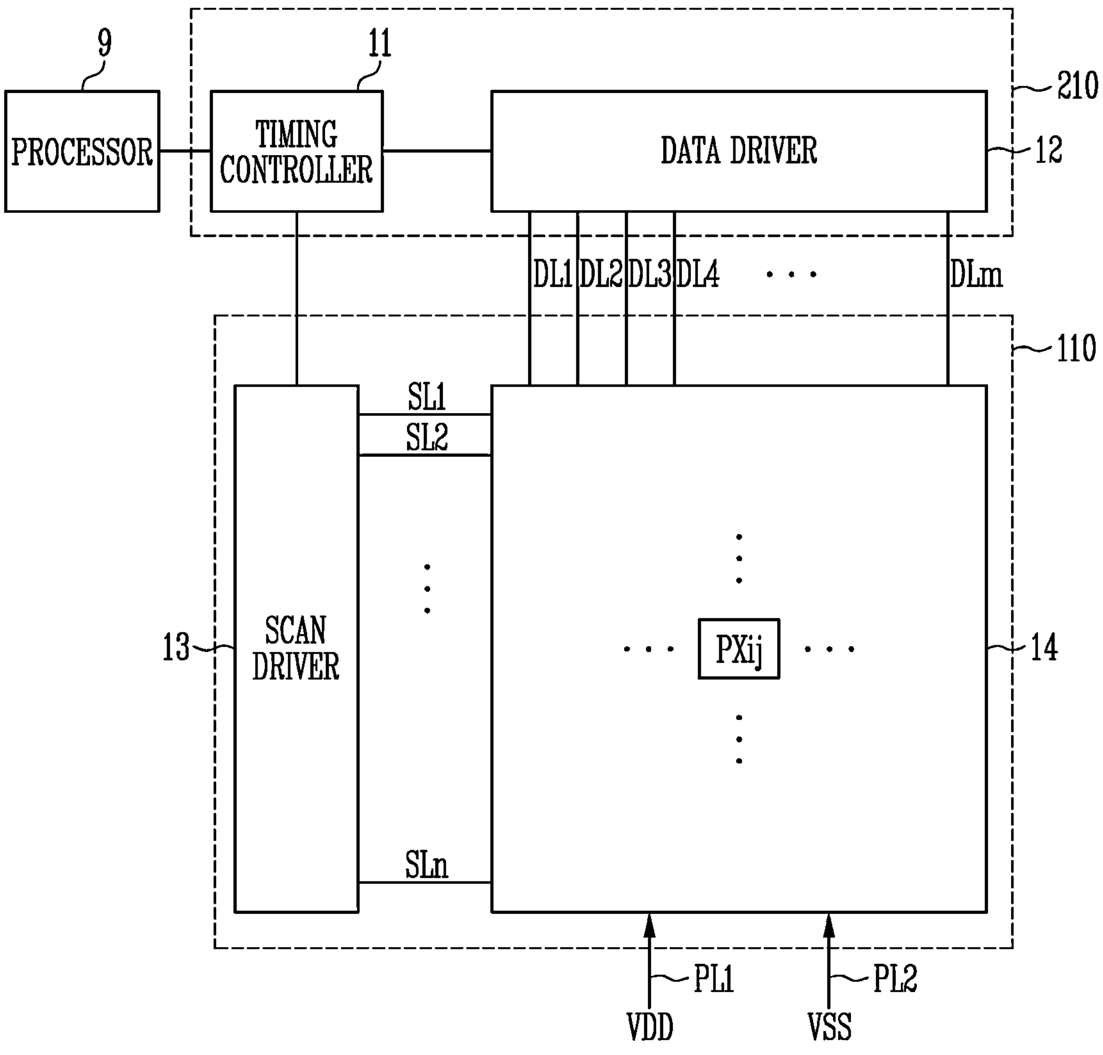
FIG. 1 is a diagram illustrating a display device in accordance with an embodiment of the present disclosure.

Hereinafter, exemplary embodiments are described in detail with reference to the accompanying drawings so that those skilled in the art may easily practice the present disclosure. The present disclosure may be implemented in various different forms and is not limited to the exemplary embodiments described in the present specification.

A part irrelevant to the description will be omitted to clearly describe the present disclosure, and the same or similar constituent elements will be designated by the same reference numerals throughout the specification. Therefore, the same reference numerals may be used in different drawings to identify the same or similar elements.

In description, the expression "equal" may mean "substantially equal." That is, this may mean equality to a degree to which those skilled in the art can understand the equality. Other expressions may be expressions in which "substantially' is omitted.

Some embodiments are described in the accompanying drawings in relation to functional blocks, units, and/or modules. Those skilled in the art will understand that these blocks, units, and/or modules are physically implemented by logic circuits, individual components, microprocessors, hard wire circuits, memory elements, line connection, and other electronic circuits. This may be formed by using semiconductor-based manufacturing techniques or other manufacturing techniques. In the case of blocks, units, and/or modules implemented by microprocessors or other similar hardware, the units, and/or modules are programmed and controlled by using software, to perform various functions discussed in the present disclosure, and may be selectively driven by firmware and/or software. In addition, each block, each unit, and/or each module may be implemented by dedicated hardware or by a combination dedicated hardware to perform some functions of the block, the unit, and/or the module and a processor (e.g., one or more programmed microprocessors and associated circuitry) to perform other functions of the block, the unit, and/or the module. In some embodiments, the blocks, the units, and/or the modules may be physically separated into two or more individual blocks, two or more individual units, and/or two or more individual modules without departing from the scope of the present disclosure. Also, in some embodiments, the blocks, the units, and/or the modules may be physically separated into more complex blocks, more complex units, and/or more complex modules without departing from the scope of the present disclosure.

The term "connection" between two components may include both electrical connection and physical connection, but the present disclosure is not necessarily limited thereto. For example, the term "connection" used based on circuit diagrams may mean electrical connection, and the term "connection" used based on sectional and plan views may mean physical connection.

It will be understood that, although the terms "first," "second," etc. may be used herein to describe various elements, these elements should not be limited by these terms. These terms are only used to distinguish one element from another element. Thus, a "first" element discussed below could also be termed a "second" element without departing from the teachings of the present disclosure.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Meanwhile, the present disclosure is not limited to embodiments disclosed below, and may be implemented in various forms. Each embodiment disclosed below may be independently embodied or be combined with at least another embodiment prior to being embodied.

FIG. 1 is a diagram illustrating a display device in accordance with an embodiment of the present disclosure.

Referring to FIG. 1, the display device in accordance with the embodiment of the present disclosure may include a display driver 210 and a display unit 110.

The display driver 210 may control the display unit 110. To this end, the display driver 210 may include a timing controller 11 and a data driver 12. The display unit 110 may display a predetermined image. To this end, the display unit 110 may include a scan driver 13 and a pixel unit 14. The display driver 210 may be configured with one IC or be configured with a plurality of ICs.

The timing controller 11 may receive data corresponding to respective frames and control signals from the processor 9. The processor may correspond to a Graphics Processing Unit ("GPU"), a Central Processing Unit ("CPU"), an Application Processor ("AP"), or the like. The control signals may include a vertical synchronization signal, a horizontal synchronization signal, a data enable signal, and/or the like.

Each cycle of the vertical synchronization signal may correspond to each frame period. Each cycle of the horizontal synchronization signal may correspond to each horizontal period. Data may be supplied in a horizontal line unit in each horizontal period, corresponding to a pulse of an enable level of the data enable signal. A horizontal line may mean pixels (e.g., a pixel row) connected to the same scan line.

The timing controller 11 may render data to correspond to specifications of the display device. The timing controller 11 may correct data such that an image with a uniform luminance can be displayed on the pixel unit 14. The data rendered or corrected by the timing controller 11 may be provided to the data driver 12. Also, the timing controller 11 may provide a data control signal to the data driver 12. Also, the timing controller 11 may provide a scan control signal to the scan driver 13.

The data driver 12 may generate a data signal (or data voltage) to be provided to data lines DL1, DL2, DL3, DL4, . . . , and DLm, using the data and the data control signal, which are received from the timing controller 11. Here, m may be a positive integer.

The scan driver 13 may generate enable scan signals to be provided to scan lines SL1, SL2, . . . , and SLn, using the scan control signal (e.g., a clock signal, a scan start signal, and/or the like) received from the timing controller 11. Here, n may be a positive integer. The enable scan signal may be set to a gate-on voltage. In an example, when a scan signal is supplied to a P-type transistor, the enable scan signal may be set to a low voltage. In an example, when the scan signal is supplied to an N-type transistor, the enable scan signal may be set to a high voltage.

The scan driver 13 may sequentially supply the enable scan signal to the scan lines SL1 to SLn. The scan driver 13 may include scan stages configured in the form of shift registers. The scan driver 13 may generate the enable scan signal in a manner that sequentially transfers the scan start signal in the form of a pulse of a turn-on level to a next scan stage under the control of the clock signal.

The pixel unit 14 may include pixels. Each of the pixels may be connected to a corresponding data line and a corresponding scan line. For example, a pixel PXij may be connected to an ith scan line and a jth data line. The pixels may include pixels emitting light of a first color, pixels emitting light of a second color, and pixels emitting light of a third color. The first color, the second color, and the third color may be different colors. For example, the first color may be one color among red, green, and blue, the second color may be one color except the first color among red, green, and blue, and the third color may be the other color except the first color and the second color among red, green, and blue. In addition, magenta, cyan, and yellow instead of red, green, and blue may be used as the first to third colors.

The pixel unit 14 may be connected to a first power line PL1 and a second power line PL2. The first power line PL1 may be supplied with a first driving power source VDD from a power supply (not shown), and the second power line PL2 may be supplied with a second driving power source VSS from the power supply (not shown).

The first driving power source VDD may be a power source which supplies a driving current to the pixels. The second driving power source VSS may be a power source supplied with a driving current from the pixels. The first driving power source VDD may be set to a voltage higher than a voltage of the second driving power source VSS during a period in which the pixels are set to be in an emission state.

The first power line PL1 and the second power line PL2 may be commonly connected to the pixels, but the embodiment of the present disclosure is not limited thereto. In another embodiment, the first power line PL1 may be configured with a plurality of power lines, and the plurality of power lines may be connected to different pixels. In an embodiment, the second power line PL2 may be configured with a plurality of power lines, and the plurality of power lines may be connected to different pixels. That is, in an embodiment of the present disclosure, each of the pixels may be connected to any one of the plurality of power lines of the first power line PL1 and any one of the plurality of power lines of the second power line PL2.

Figure 2:
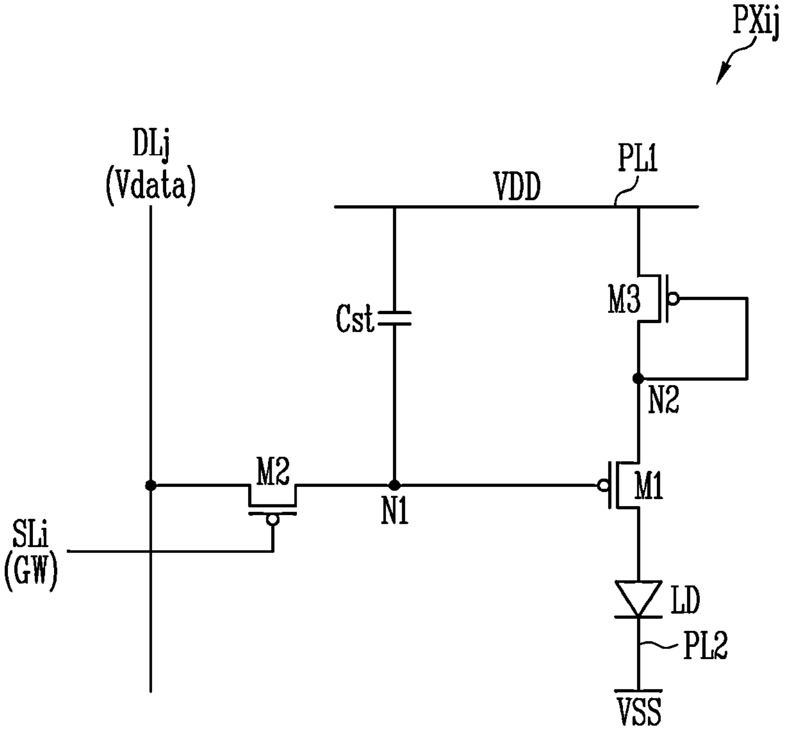
FIG. 2 is a diagram illustrating a pixel in accordance with an embodiment of the present disclosure.

FIG. 2 is a diagram illustrating a pixel in accordance with an embodiment of the present disclosure.

Referring to FIG. 2, the pixel PXij in accordance with the embodiment of the present disclosure may be connected to corresponding signal lines SLi and DLj. For example, the pixel PXij may be connected to an ith scan line SLi and a jth data line DLj. In an embodiment, the pixel PXij may be further connected to the first power line PL1 and the second power line PL2.

The pixel PXij in accordance with the embodiment of the present disclosure may include a light emitting element LD and a pixel circuit for controlling an amount of current supplied to the light emitting element LD.

The light emitting element LD may be connected between the first power line PL1 and the second power line PL2. In an example, a first electrode (or anode electrode) of the light emitting element LD may be electrically connected to the first power line PL1 via a first transistor M1 and a third transistor M3, and a second electrode (or cathode electrode) of the light emitting element LD may be electrically connected to the second power line PL2. The light emitting element LD may generate light with a predetermined luminance, corresponding to an amount of current supplied from the first power line PL1 to the second power line PL2 via the pixel circuit.

The light emitting element LD may be selected as an organic light emitting diode. Also, the light emitting element LD may be selected as an inorganic light emitting diode such as a micro-LED (light emitting diode) or a quantum dot light emitting diode. Also, the light emitting element LD may be an element configured with a combination of an organic material and an inorganic material. In FIG. 2, it is illustrated that the pixel PXij includes a single light emitting element LD. However, in another embodiment, the pixel PXij may include a plurality of light emitting elements LD, and the plurality of light emitting elements LD may be connected in series, parallel or series/parallel to each other.

The pixel circuit may include the first transistor M1, a second transistor M2, the third transistor M3, and a storage capacitor Cst. In an embodiment, the first transistor M1 to the third transistor M3 may be formed with a P-type transistor.

A first electrode of the first transistor M1 (or driving transistor) may be electrically connected to a second node N2, and a second electrode of the first transistor M1 may be connected to the first electrode (i.e., anode electrode) of the light emitting element LD. In addition, a gate electrode of the first transistor M1 may be connected to a first node N1. The term "being connected" includes a meaning of "being electrically connected." The first transistor M1 may control an amount of current flowing from the first driving power source VDD to the second driving power source VSS via the light emitting element LD, corresponding to a voltage of the first node N1.

The second transistor M2 may be connected between the data line DLj and the first node N1. In addition, a gate electrode of the second transistor M2 may be connected to the scan line SLi (or first scan line). The second transistor M2 may be turned on when an enable scan signal is supplied to the scan line SLi, to electrically connect the data line DLj and the first node N1 to each other.

The third transistor M3 may be connected between the first power line PL1 and the second node N2. In addition, a gate electrode of the third transistor M3 may be connected to the second node N2. The third transistor M3 may be connected in a diode form (or diode-connected) such that a current can be supplied to the second node N2 from the first power line PL1. In an example, the third transistor M3 may supply a predetermined current to the second node N2 from the first driving power source VDD while maintaining a turn-on state.

The storage capacitor Cst may be connected between the first power line PL1 and the first node N1. The storage capacitor Cst may store the voltage of the first node N1.

The pixel PXij in accordance with the embodiment of the present disclosure may compensate for a threshold voltage of the first transistor M1, using source degeneration. The source degeneration may mean that a resistor or a diode is connected to a source electrode of a transistor, and influence of an intrinsic transconductance gm on an equivalent transconductance GM is minimized by negative feedback.

When the light emitting element LD is a micro-LED, the pixel PXij may achieve a white luminance at a current level of a few nA. When the diode-connected third transistor M3 is connected to the first electrode (i.e., a source electrode) of the first transistor M1 (or when the third transistor M3 having a high resistance is connected), a current change caused by a threshold voltage deviation of the first transistor M1 may be minimized by the source degeneration.

The equivalent transconductance GM of the pixel PXij may be represented as shown in Equation 1.

$$GM = \frac{1}{\frac{1}{gm} + Rd} \quad \text{Equation 1}$$

In Equation 1, Rd may denote a resistance component of the third transistor M3. When Rd has a high value as compared with gm, GM≈1/Rd. Additionally, gm of the first transistor M1 may be represented as shown in Equation 2.

$$gm = \mu pCox\frac{W}{L}(Vgs - Vth) \quad \text{Equation 2}$$

In Equation 2, μ may denote an electron mobility, Cox may denote an oxide capacitance, W may denote a channel width, L may denote a channel length, Vgs may denote a voltage difference between the gate electrode and the source electrode of the first transistor M1, and Vth may denote a threshold voltage of the first transistor M1. Referring to Equations 1 and 2, when the resistance component Rd of the third transistor M3 is high, a current change caused by a threshold voltage difference of the first transistor M1 becomes insensitive.

That is, in the pixel PXij in accordance with the embodiment of the present disclosure, the diode-connected third transistor M3 is connected to the first electrode of the first transistor M1, so that the current change caused by the threshold voltage difference of the first transistor M1 can be minimized.

In addition, the pixel PXij in accordance with the embodiment of the present disclosure includes three transistors M1, M2, M3 and one capacitor Cst. Also, the pixel PXij in accordance with the embodiment of the present disclosure is connected to two power lines PL1 and PL2. Each of pixels known in the art, which compensate for the threshold voltage of the first transistor M1, may be connected to four or more power lines and six or more transistors. That is, in the pixel PXij in accordance with the embodiment of the present disclosure, the area occupied by the power lines and the area occupied by the transistors can be minimized. Accordingly, the pixel PXij can be applied to a high-resolution panel.

Meanwhile, a case where the first transistor M1 is formed with an N-type transistor may be predicted. When the first transistor M1 is formed with the N-type transistor, a source electrode voltage may be changed by degradation of the light emitting element LD connected to the source electrode, and accordingly, it is difficult to display an image with a desired luminance.

Figure 3:
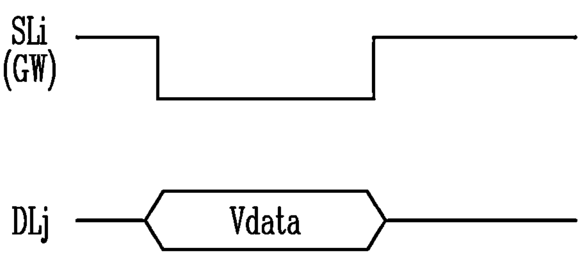
FIG. 3 is a waveform diagram illustrating a method of driving the pixel shown in FIG. 2.
Figure 4A:
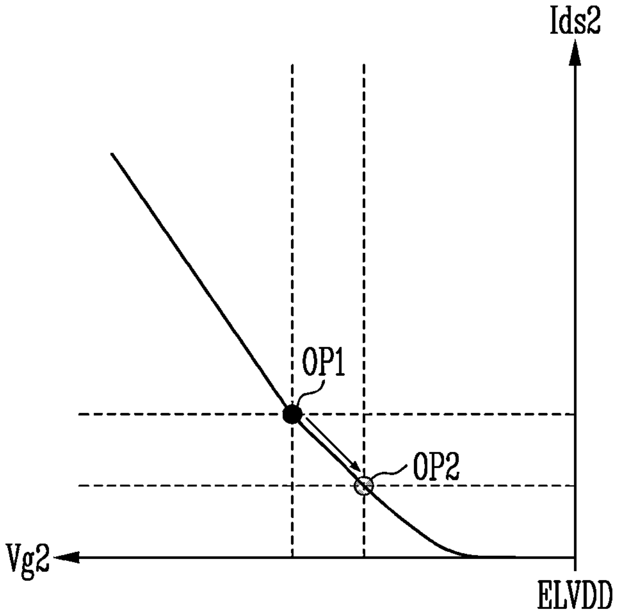
FIGS. 4A to 4C are diagrams illustrating a principle of compensating for a threshold voltage of a first transistor.
Figure 4B:
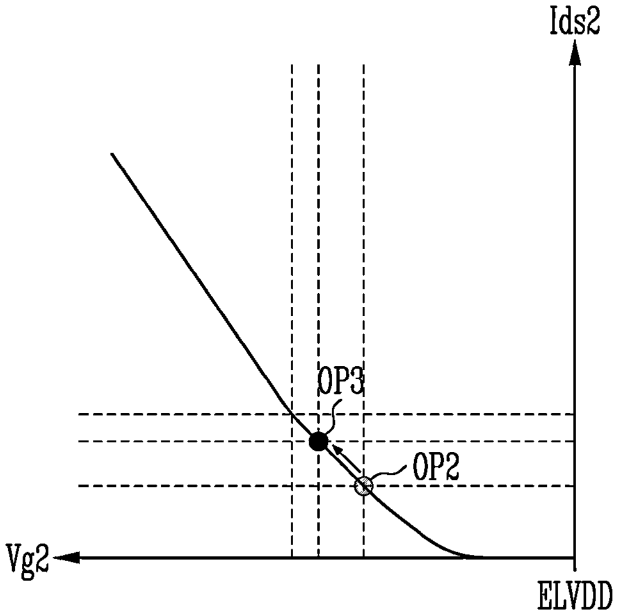
Figure 4C:
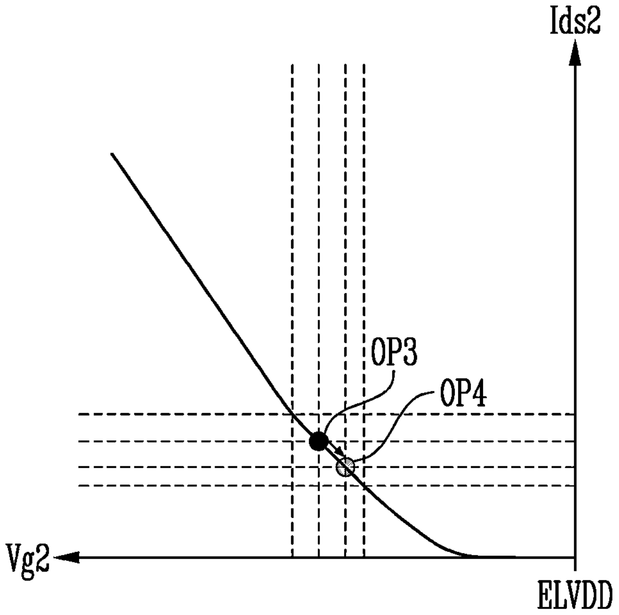

FIG. 3 is a waveform diagram illustrating a method of driving the pixel shown in FIG. 2. FIGS. 4A to 4C are diagrams illustrating a principle of compensating for the threshold voltage of the first transistor. In FIGS. 4A to 4C, Ids2 indicated on the Y axis represents current of the third transistor M3, Vg2 indicated on the X axis represents gate electrode voltage of the third transistor M3.

Referring to FIG. 3, an enable (or low voltage) scan signal GW may be supplied to the scan line SLi such that the second transistor M2 is turned on. When the second transistor M2 is turned on, a data signal from the data line DLj may be supplied to the first node N1. The storage capacitor Cst may store a voltage Vdata of the data signal supplied to the first node N1.

After that, a disable (or high voltage) scan signal GW may be supplied to the scan line SLi such that the second transistor M2 is turned off. In addition, the first transistor M1 may control an amount of current supplied from the first power line PL1 to the second power line PL2 via the light emitting element LD, corresponding to the voltage of the first node N1 (i.e., the voltage Vdata of the data signal). The light emitting element LD may generate light with a predetermined luminance, corresponding to the amount of current supplied from the first transistor M1.

When the threshold voltage of the first transistor M1 is relatively high, the first transistor M1 may supply a relatively low current to the light emitting element LD. As shown in FIG. 4A, an operating point of the third transistor M3 may be changed from a first point OP1 to a second point OP2.

As a voltage of the second node N2 increases, a voltage difference between the second node N2 and the first node N1 may be increased (i.e., a voltage difference between the source electrode and the gate electrode of the first transistor M1 may be increased). When the voltage difference between the second node N2 and the first node N1 is increased, the operating point of the third transistor M3 may be changed from the second point OP2 to a third point OP3 as shown in FIG. 4B. Then, a current amount of the third transistor M3 may be increased. However, the increased current amount may be set lower than a current amount decreased by the change in the operating point (from OP1 to OP2) shown in FIG. 4A.

When the operating point of the third transistor M3 is changed to the third point OP3, the voltage difference between the second node N2 and the first node N1 may be decreased as the voltage of the second node N2 decreases. When the voltage difference between the second node N2 and the first node N1 is decreased, the operating point of the third transistor M3 may be changed from the third point OP3 to a fourth point OP4 as shown in FIG. 4C. Then, the current amount of the third transistor M3 may be decreased. However, the decreased current amount may be set to lower than a current amount increased by the change in the operating point (from OP2 to OP3) shown in FIG. 4B.

When such a process is repeated, the voltage of the second node N2 may be set as a predetermined voltage by negative feedback. The voltage of the second node N2 may be determined by reflecting the threshold voltage of the first transistor M1, and accordingly, the threshold voltage of the first transistor M1 can be compensated.

Figure 5:
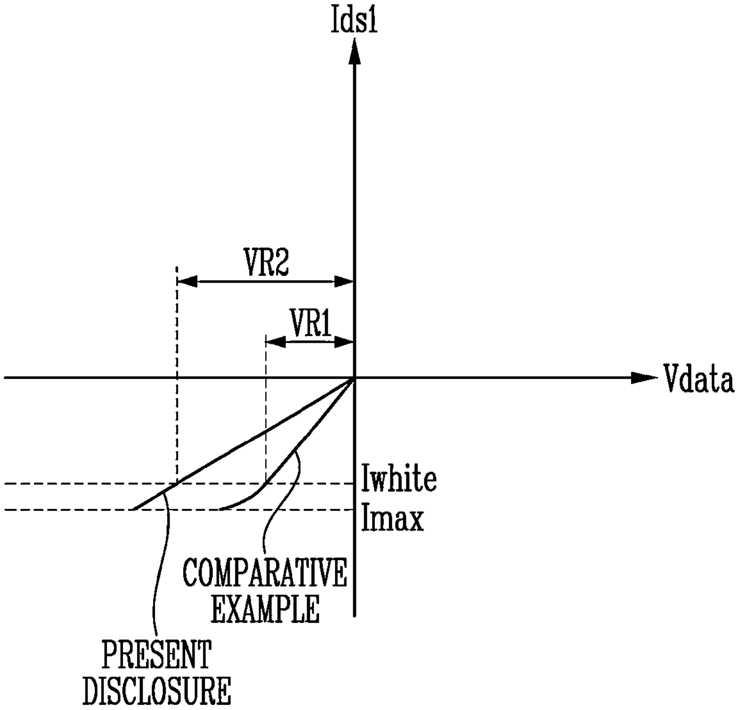
FIG. 5 is a diagram illustrating a voltage range of a data signal voltage range according to the pixel shown in FIG. 2.

FIG. 5 is a diagram illustrating a voltage range of a data signal according to the pixel shown in FIG. 2. In FIG. 5, Ids1 indicated on the Y axis represents current of the first transistor M1, Vdata indicated on the X axis represents voltage of the data signal. In addition, Iwhite shown in FIG. 5 represents a current value for displaying white, and Imax represents a capable highest current flowing through the first transistor M1. In addition, a comparative example shown in FIG. 5 represents a pixel in which the third transistor M3 is removed from the pixel PXij shown in FIG. 2, and the present disclosure represents the pixel PXij shown in FIG. 2.

Referring to FIG. 5, in the case of the comparative example, the voltage range (data swing range) of the data signal may be set as a first voltage range VR1. As compared with this, the voltage range of the data signal in the pixel PXij of the present disclosure may be set as a second voltage range VR2 (or have a voltage range) wider than the first voltage range VR1.

In the case of the pixel PXij of the present disclosure, the voltage range VR2 may be further widened by source degeneration so as to emit the same luminance as the comparative example. When the voltage range of the data signal is widened, a desired luminance can be stably implemented.

Figure 6:
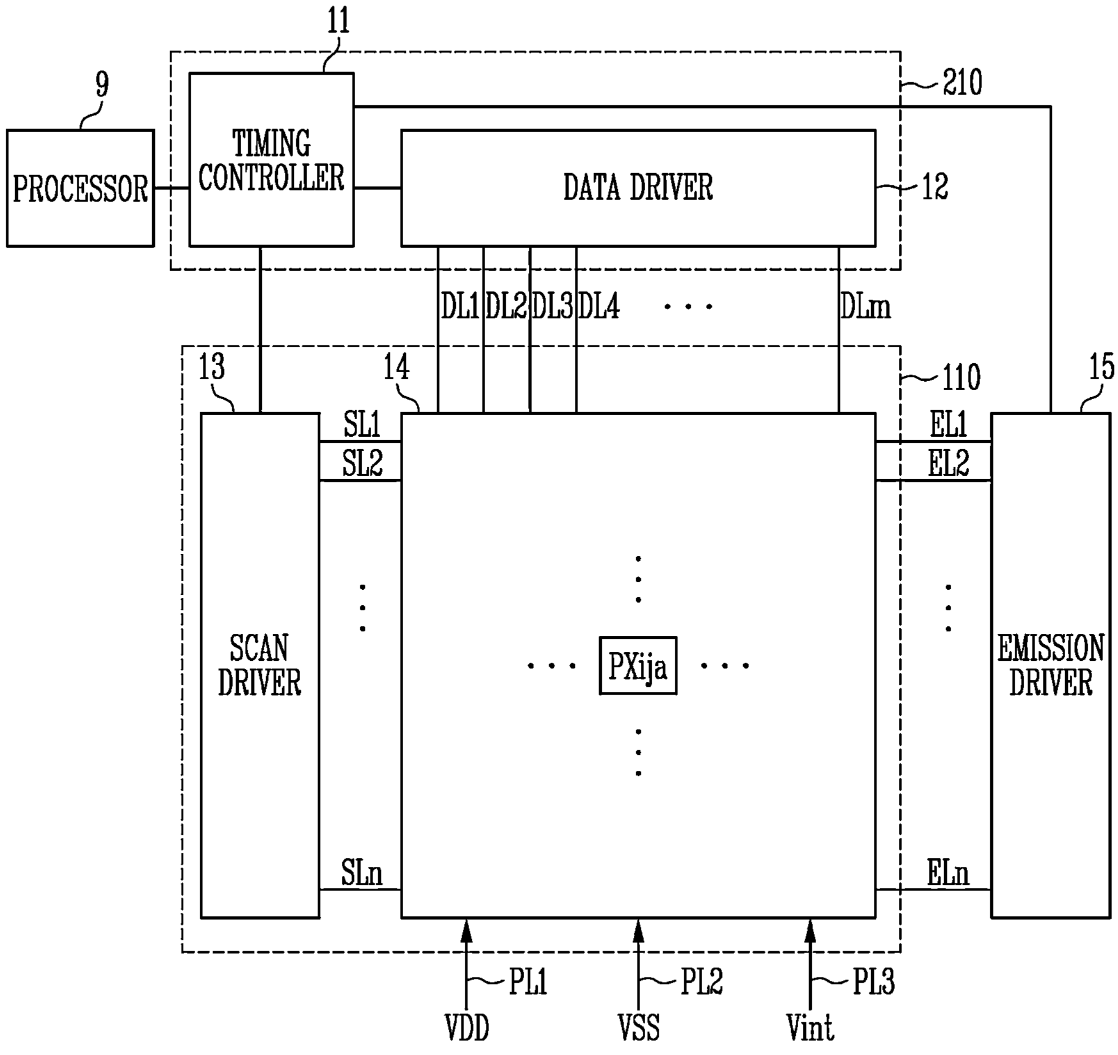
FIG. 6 is a diagram illustrating a display device in accordance with an embodiment of the present disclosure.

FIG. 6 is a diagram illustrating a display device in accordance with an embodiment of the present disclosure. In FIG. 6, detailed descriptions of components overlapping with those shown in FIG. 1 will be omitted.

Referring to FIG. 6, the display device in accordance with the embodiment of the present disclosure may further include an emission driver 15. The emission driver 15 may be included in the display unit 110. In an example, the scan driver 13 and the emission driver 15 may be formed together with the pixels in the pixel unit 14.

The emission driver 15 may receive an emission driving signal (e.g., a clock signal, an emission start signal, and/or the like) from the timing controller 11. The emission driver 15 may generate disable emission control signals to be provided to emission control lines EL1, EL2, . . . , and ELn, corresponding to the emission driving signal. The disable emission control signal may be set to a gate-off voltage. In an example, when the emission control signal is supplied to a P-type transistor, the disable emission control signal may be set to a high voltage. In an example, when the emission control signal is supplied to an N-type transistor, the disable emission control signal may be set to a low voltage.

The emission driver 15 may sequentially supply the disable emission control signal to the emission control lines EL1 to ELn. The emission driver 15 may include emission stages configured in the form of shift registers. The emission driver 15 may generate the disable emission control signal in a manner that sequentially transfers the emission start signal in the form of a pulse of a turn-off level to a next scan stage under the control of the clock signal.

The pixel unit 14 may be further connected to a third power line PL3. The third power line PLC may be supplied with an initialization power source Vint. A voltage of the initialization power source Vint may be set such that the light emitting element LD is turned off when the voltage of the initialization power source Vint to the first electrode (i.e., anode electrode) of the light emitting element LD. The third power line PL3 may be commonly connected to the pixels, but the embodiment of the present disclosure is not limited thereto. In another embodiment, the third power line PL3 may be configured with a plurality of power lines, and the plurality of power lines may be connected to different pixels.

Figure 7:
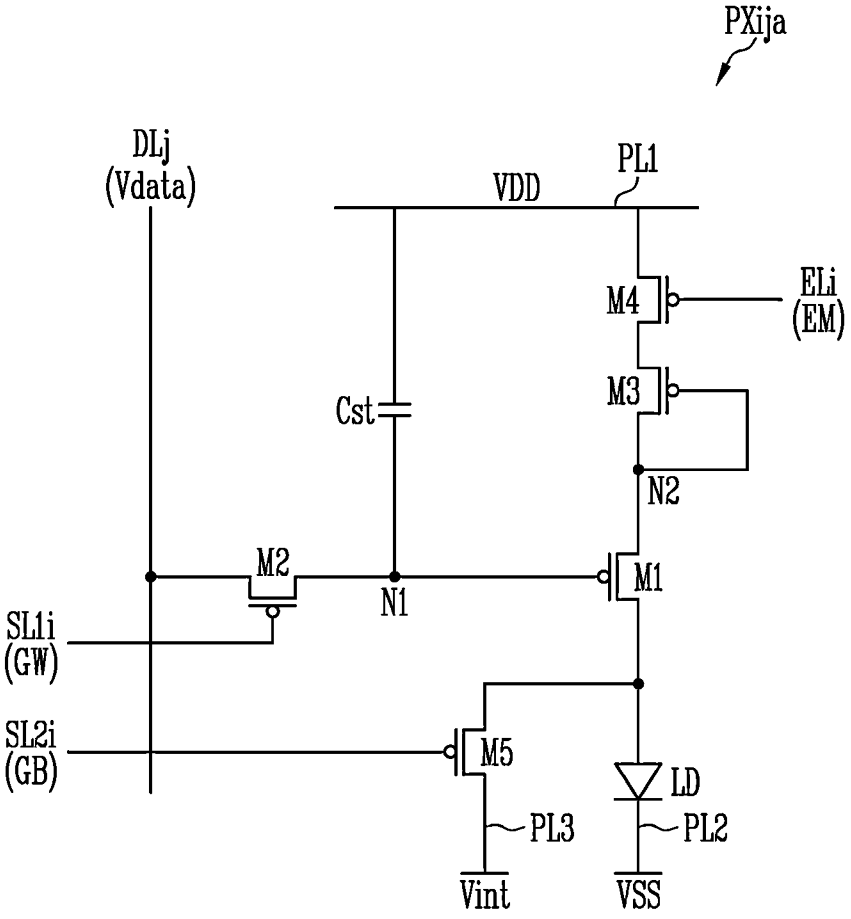
FIG. 7 is a diagram illustrating a pixel in accordance with an embodiment of the present disclosure.

FIG. 7 is a diagram illustrating a pixel in accordance with an embodiment of the present disclosure. In FIG. 7, components identical or similar to those shown in FIG. 2 are designated by like reference numerals.

Referring to FIG. 7, the pixel PXija in accordance with the embodiment of the present disclosure may be connected to corresponding signal lines SLi and DLj. For example, the pixel PXija may be connected to an ith scan line SLi and a jth data line DLj. The ith scan line SLi may include an ith first scan line SL1*i* and an ith second scan line SL2*i*. In an embodiment, the pixel PXija may be further connected to the first power line PL1, the second power line PL2, and the third power line PL3.

The pixel PXija in accordance with the embodiment of the present disclosure may include a light emitting element LD and a pixel circuit for controlling an amount of current supplied to the light emitting element LD.

The light emitting element LD may be connected between the first power line PL1 and the second power line PL2. In an example, a first electrode (or anode electrode) of the light emitting element LD may be electrically connected to the first power line PL1 via a first transistor M1, a third transistor M3, and a fourth transistor M4, and a second electrode (or cathode electrode) of the light emitting element LD may be electrically connected to the second power line PL2. The light emitting element LD may generate light with a predetermined luminance, corresponding to an amount of current supplied from the first power line PL1 to the second power line PL2 via the pixel circuit.

The light emitting element LD may be selected as an organic light emitting diode. Also, the light emitting element LD may be selected as an inorganic light emitting diode such as a micro-LED (light emitting diode) or a quantum dot light emitting diode. Also, the light emitting element LD may be an element configured with a combination of an organic material and an inorganic material. In FIG. 7, it is illustrated that the pixel PXija includes a single light emitting element LD. However, in another embodiment, the pixel PXija may include a plurality of light emitting elements LD, and the plurality of light emitting elements LD may be connected in series, parallel or series/parallel to each other.

The pixel circuit may include the first transistor M1, a second transistor M2, the third transistor M3, the fourth transistor M4, a fifth transistor M5, and a storage capacitor Cst. In an embodiment, the first transistor M1 to the fifth transistor M5 may be formed with a P-type transistor.

A first electrode of the first transistor M1 (or driving transistor) may be electrically connected to a second node N2, and a second electrode of the first transistor M1 may be connected to the first electrode (i.e., anode electrode) of the light emitting element LD. In addition, a gate electrode of the first transistor M1 may be connected to a first node N1. The first transistor M1 may control an amount of current flowing from the first driving power source VDD to the second driving power source VSS via the light emitting element LD, corresponding to a voltage of the first node N1.

The second transistor M2 may be connected between the data line DLj and the first node N1. In addition, a gate electrode of the second transistor M2 may be connected to the first scan line SL1*i*. The second transistor M2 may be turned on when an enable first scan signal GW is supplied to the first scan line SL1*i*, to electrically connect the data line DLj and the first node N1 to each other.

The third transistor M3 may be connected between a second electrode of the fourth transistor M4 and a second node N2. In addition, a gate electrode of the third transistor M3 may be connected to the second node N2. The third transistor M3 may be connected in a diode form (or diode-connected) such that a current can be supplied to the second node N2 from the first power line PL1. In an example, the third transistor M3 may supply a predetermined current to the second node N2 from the first driving power source VDD while maintaining the turn-on state.

A first electrode of the fourth transistor M4 may be connected to the first power line PL1, and the second electrode of the fourth transistor M4 may be connected to a first electrode of the third transistor M3. In addition, a gate electrode of the fourth transistor M4 may be connected to an emission control line ELi. The fourth transistor M4 may be turned off when a disable emission control signal EM is supplied to the emission control line ELi, and be turned on when an enable emission control signal EM is supplied to the emission control line ELi.

The fifth transistor M5 may be connected between the first electrode (i.e., anode electrode) of the light emitting element LD and the third power line PI3. In addition, a gate electrode of the fifth transistor M5 may be connected to the second scan line SL2*i*. The fifth transistor M5 may be turned on when an enable second scan signal GB is supplied to the second scan line SL2*i*, to supply the voltage of the initialization power source Vint from the third power line PL3 to the first electrode (i.e., anode electrode) of the light emitting element LD.

The storage capacitor Cst may be connected between the first power line PL1 and the first node N1. The storage capacitor Cst may store the voltage of the first node N1.

The pixel PXija in accordance with the embodiment of the present disclosure may compensate for a threshold voltage of the first transistor M1, using source degeneration. That is, the pixel PXija in accordance with the embodiment of the present disclosure may compensate for the threshold voltage of the first transistor M1, using the diode-connected third transistor M3.

The pixel PXija in accordance with the embodiment of the present disclosure includes five transistors M1, M2, M3, M4, and M5 and one capacitor Cst. Also, the pixel PXija in accordance with the embodiment of the present disclosure is connected to three power lines PL1, PL2, and PL3. In the pixel PXija in accordance with the embodiment of the present disclosure, the area occupied by the power lines and the area occupied by the transistors can be minimized. Accordingly, the pixel PXija can be applied to a high-resolution panel.

Figure 8:
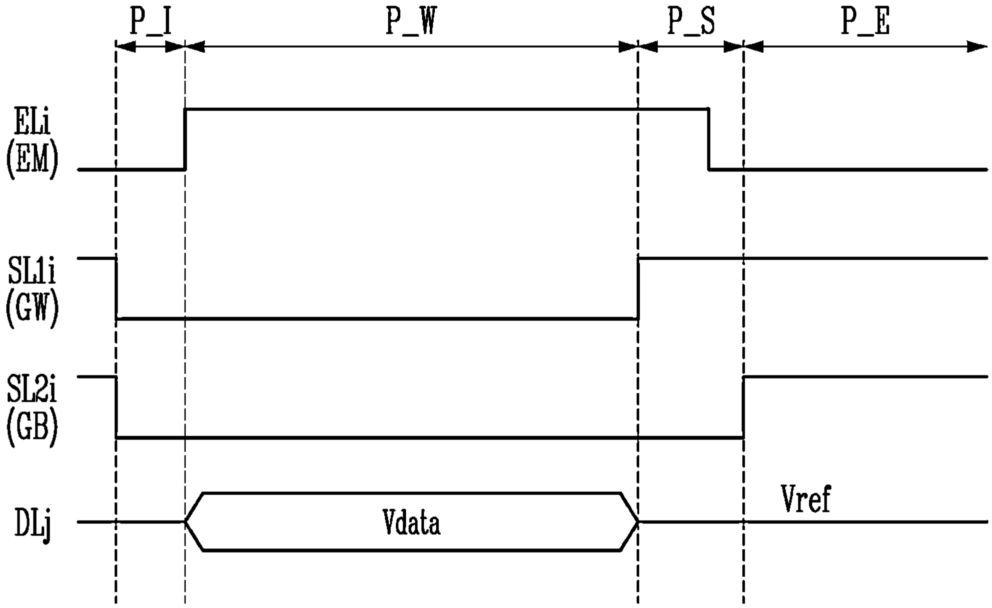
FIG. 8 is a waveform diagram illustrating a method of driving the pixel shown in FIG. 7.

FIG. 8 is a waveform diagram illustrating a method of driving the pixel shown in FIG. 7.

Referring to FIG. 8, the pixel PXija in accordance with the embodiment of the present disclosure may be sequentially driven in an initialization period P_I, a writing period P_W, a stabilization period P_S, and an emission period P_E.

During the initialization period P_I, the enable first scan signal GW may be supplied to the first scan line SL1*i*, and the enable second scan signal GB may be supplied to the second scan line SL2*i*. Also, during the initialization period P_I, a reference power source Vref may be supplied to the data line DLj.

When the enable first scan signal GW is supplied to the first scan line SL1*i*, the second transistor M2 may be turned on. When the second transistor M2 is turned on, a voltage of the reference power source Vref from the data line DLj may be supplied to the first node N1. The reference power source Vref may be set to a constant voltage. When the voltage of the reference power source Vref is supplied to the first node N1, the storage capacitor Cst may be initialized to the voltage of the reference power source Vref.

When the enable second scan signal GB is supplied to the second scan line SL2*i*, the fifth transistor M5 may be turned on. When the fifth transistor M5 is turned on, the voltage of the initialization power source Vint may be supplied to the first electrode (i.e., anode electrode) of the light emitting element LD. A parasitic capacitor (not shown) included in the light emitting element LD is discharged, so that black expression ability can be improved.

During the writing period P_W, the enable first scan signal GW may be supplied to the first scan line SL1*i*, and the enable second scan signal GB may be supplied to the second scan line SL2*i*. Also, during the writing period P_W, a data signal may be supplied to the data line DLj, and the disable emission control signal EM may be supplied to the emission control line ELi.

When the disable emission control signal EM is supplied to the emission control line ELi, the fourth transistor M4 may be turned off. When the fourth transistor M4 is turned off, electrical connection between the first power line PL1 and the first transistor M1 may be blocked, and accordingly, the pixel PXija may be set to be in a non-emission state.

When the enable first scan signal GW is supplied to the first scan line SL1*i*, the second transistor M2 may be turned on. When the second transistor M2 is turned on, a voltage Vdata of the data signal from the data line DLj may be supplied to the first node N1. The voltage Vdata of the data signal may be stored in the storage capacitor Cst.

When the enable second scan signal GB is supplied to the second scan line SL2*i*, the fifth transistor M5 may be turned on. When the fifth transistor M5 is turned on, the voltage of the initialization power source Vint may be supplied to the first electrode (i.e., anode electrode) of the light emitting element LD.

In the stabilization period P_S, a disable first scan signal GW may be supplied to the first scan line SL1*i*. When the disable first scan signal GW is supplied to the first scan line SL1*i*, the second transistor M2 may be turned off.

Also, in the stabilization period P_S, the enable second scan signal GB may be supplied to the second scan line SL2*i*, and accordingly, the fifth transistor M5 may maintain the turn-on state. Also, during the stabilization period P_S, the enable emission control signal EM (or low voltage emission control signal EM) may be supplied to the emission control line ELi. When the enable emission control signal EM is supplied to the emission control line ELi, the fourth transistor M4 may be turned on. When the fourth transistor M4 is turned on, the first power line PL1 and the first transistor M1 may be electrically connected to each other.

The first transistor M1 may supply a current corresponding to the voltage of the first node N1 to the first electrode (i.e., anode electrode) of the light emitting element LD. The current supplied from the first transistor M1 may be supplied to the third power line PL3 via the fifth transistor M5. That is, during the stabilization period P_S, the current from the first transistor M1 does not pass through the light emitting element LD, but may be supplied to the third power line PL3. According to the stabilization period P_S, the black expression ability can be improved, and the light emitting element LD can be prevented from emitting light with an unwanted luminance in initial emission.

In the emission period P_E, a disable second scan signal GB may be supplied to the second scan line SL2*i* such that the fifth transistor M5 is turned off. When the fifth transistor M5 is turned off, the current supplied from the first transistor M1 may be supplied to the light emitting element LD, and accordingly, the light emitting element LD may generate light with a predetermined luminance.

Additionally, during the emission period P_E, the current flowing through the first transistor M1 may be represented as shown in Equation 3.

Equation 3

$$Id = \frac{1}{2}\mu pCox\frac{W}{L}\left(\frac{VDD - Vdsat3 - |Vth3| - (Vdata - Vref)}{1 + gm1Rd} - |Vth1|\right)^2$$

In Equation 3, Id may denote an amount of current flowing through the first transistor M1, Vdsat3 may denote a saturation voltage, Vth3 may denote a threshold voltage of the third transistor M3, gm1 may denote a gm of the first transistor M1, Rd may denote a resistance component of the third transistor M3, and Vth1 may denote a threshold voltage of the first transistor M1.

Referring to Equation 3, it can be seen that, when the resistance component Rd of the third transistor M3 is increased, a coefficient of Vdata becomes small, and hence the voltage range of the data signal is increased.

Figure 9:
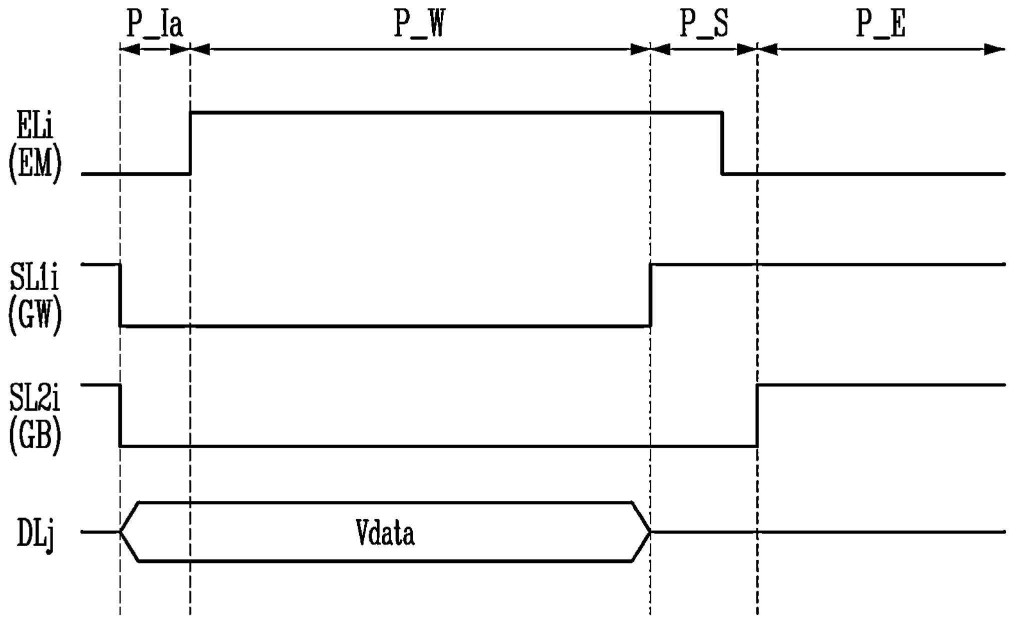
FIG. 9 is a waveform diagram illustrating a method of driving the pixel shown in FIG. 7 according to another embodiment.

FIG. 9 is a waveform diagram illustrating a method of driving the pixel shown in FIG. 7 according to another embodiment. In FIG. 9, descriptions of portions overlapping with those described in FIG. 8 will be omitted.

Referring to FIG. 9, the pixel PXija in accordance with the embodiment of the present disclosure may be sequentially driven in an initialization period P_Ia, a writing period P_W, a stabilization period P_S, and an emission period P_E.

During the initialization period P_Ia, the enable first scan signal GW may be supplied to the first scan line SL1*i*, and the enable second scan signal GB may be supplied to the second scan line SL2*i*. Also, the initialization period P_Ia, a voltage Vdata of a data signal may be supplied to the data line DLj.

When the enable first scan signal GW is supplied to the first scan line SL1*i*, the second transistor M2 may be turned on. When the second transistor M2 is turned on, the voltage Vdata of the data signal from the data line DLj may be supplied to the first node N1. When the voltage Vdata of the data signal is supplied to the first node N1, the voltage Vdata of the data signal may be stored in the storage capacitor Cst.

When the enable second scan signal GB is supplied to the second scan line SL2*i*, the fifth transistor M5 may be turned on. When the fifth transistor M5 is turned on, the voltage of the initialization power source Vint may be supplied to the first electrode (i.e., anode electrode) of the light emitting element LD. The parasitic capacitor (not shown) included in the light emitting element LD is discharged, so that the black expression ability can be improved.

The writing period P_W, the stabilization period P_S, and the emission period P_E have been described with reference to FIG. 8, and therefore, overlapping descriptions will be omitted.

Figure 10:
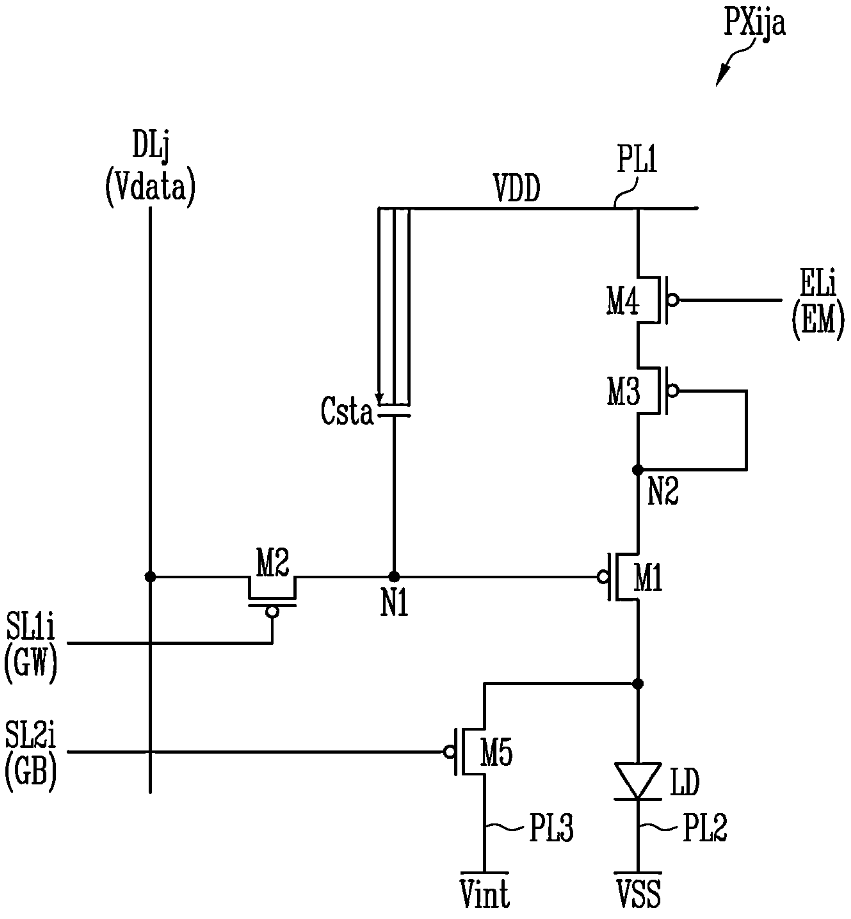
FIG. 10 is a diagram illustrating a pixel in accordance with an embodiment of the present disclosure.

FIG. 10 is a diagram illustrating a pixel in accordance with an embodiment of the present disclosure. In FIG. 10, components identical or similar to those shown in FIG. 7 are designated by like reference numerals, and overlapping descriptions will be omitted.

Referring to FIGS. 2 and 7, the storage capacitor Cst may be formed as a Metal-Oxide-Metal (MOM) capacitor or a Metal-Insulator-Metal (MIM) capacitor.

Referring to FIG. 10, a storage capacitor Csta may be formed as a Meal-Oxide-Semiconductor (MOS) capacitor.

That is, in an embodiment of the present disclosure, the storage capacitor Cst or Csta may be formed as any one of the MOM capacitor, the MIM capacitor, and the MOS capacitor.

Additionally, in the pixel PXija shown in FIGS. 7 and 10, the size of the first transistor M1 may be increased, thereby improving Short Range Uniformity ("SRU"). To this end, the first transistor M1, the second transistor M2, and the fifth transistor M5 may be formed with a high voltage MOSFET (e.g., 6V, 8V or 10V), and the third transistor M3 and the fourth transistor M4 may be formed with a medium voltage MOSFET (e.g., 3.3V or 5V).

When the third transistor M3 and the fourth transistor M4 are formed with the medium voltage MOSFET, the mounting side of the third transistor M3 and the fourth transistor M4 may be reduced, and accordingly, the pixel PXija can be applied to a high-resolution panel.

In an embodiment, when the fourth transistor M4 is set as the medium voltage MOSFET, a high voltage of the emission control signal EM (e.g., a voltage of the disable emission control signal) may be set different from a high voltage of any of the scan signals GW and GB (e.g., a voltage of the disable scan signal). In an example, the high voltage of the emission control signal EM may be set as a voltage lower than the high voltage of any of the scan signals GW and GB.

In an embodiment, when the third transistor M3 is formed as the medium voltage MOSFET, the threshold voltage of the third transistor M3 may be set low as compared with when the third transistor M3 is formed as the high voltage MOSFET. Thus, additional driving voltage margin can be secured. However, the embodiment of the present disclosure is not limited thereto. In another example, the first transistor M1 to the fifth transistor M5 may be formed with the high voltage MOSFET.

FIGS. 11 to 14 are exemplary diagrams illustrating electronic devices in accordance with various embodiments of the present disclosure.

Figure 11:
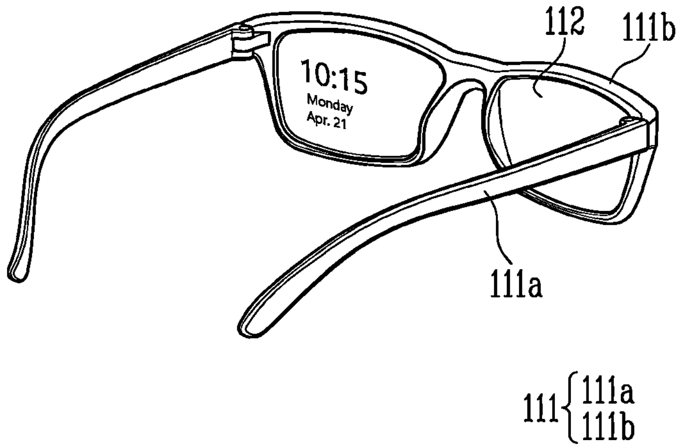
FIGS. 11 to 14 are exemplary diagrams illustrating electronic devices in accordance with various embodiments of the present disclosure.

Referring to FIG. 11, the display device to which the pixels in accordance with the above-described embodiments are applied may be applied to smart glasses. The smart glasses include a frame 111 and a lens part 112. The smart glasses are a wearable electronic device which can be worn on the face of a user, and may have a structure in which a portion of the frame 111 is folded or unfolded. For example, the smart glasses may be a wearable device for Augmented Reality (AR).

The frame 111 may include a housing 111*b* supporting the lens part 112 and a leg part 111*a* for allowing the user to wear the smart glasses. The leg part 111*a* may be connected to the housing 111*b* by a hinge to be folded or unfolded.

A battery, a touch pad, a microphone, and/or a camera may be built in the frame 111. In addition, a projector for outputting light and/or a processor for controlling a light signal may be built in the frame 111.

The lens part 112 may be an optical member which allows light to be transmitted therethrough or allows light to be reflected thereby. The lens part 112 may include glass and/or transparent synthetic resin.

The display device to which the pixels in accordance with the above-described embodiments are applied may be applied to the lens part 112. In an example, the user may recognize an image displayed by a light signal transmitted from the projector of the frame 111 through the lens part 112. For example, the user may recognize information including time, data, and/or the like, which are displayed on the lens part 112.

Figure 12:
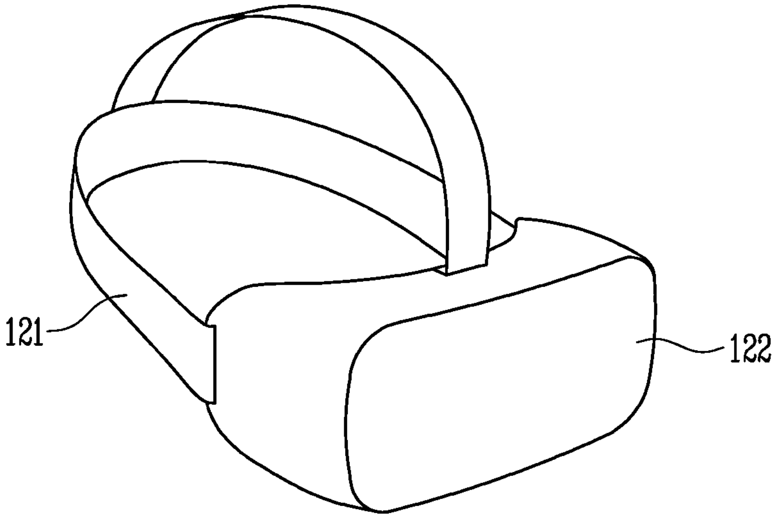

Referring to FIG. 12, the display device to which the pixels in accordance with the above-described embodiments are applied may be applied to a Head Mounted Display (HMD). The HMD may include a head mounted band 121 and a display accommodating case 122. For example, the HMD is a wearable electronic device which can be worn on the head of a user.

The head mounted band 121 may be connected to the display accommodating case 122, to fix the display accommodating case 122. The head mounted band 121 may include a horizontal band and a vertical band to fix the HMD to the head of the user. The horizontal band may be provided to surround a side portion of the head of the user, and the vertical band may be provided to surround a top portion of the head of the user. However, the present disclosure is not necessarily limited thereto, and the head mounted band 121 may be implemented in the shape of a glasses frame or a helmet.

The display accommodating case 122 accommodates the display device, and may include at least one lens. The at least one lens may provide an image to the user. For example, the display device to which the pixels in accordance with the above-described embodiments are applied may be applied to a left-eye lens and a right-eye lens, which are implemented in the display accommodating case 122.

Figure 13:
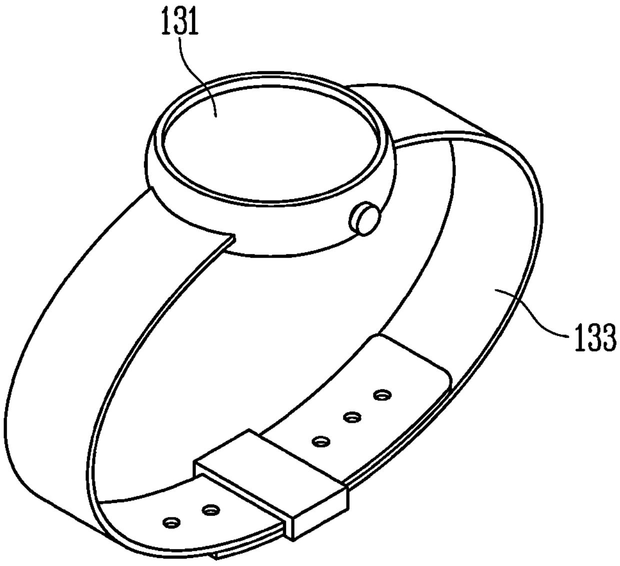

Referring to FIG. 13, the display device to which the pixels in accordance with the above-described embodiments are applied may be applied to a smart watch. The smart watch may include a display part 131 and a strap part 133. The smart watch is a wearable electronic device, and may be mounted on a wrist of a user. The display device to which the pixels in accordance with the above-described embodiments are applied may be applied to the display part 131. For example, the display part 131 may provide image data including information such as time and data.

Figure 14:
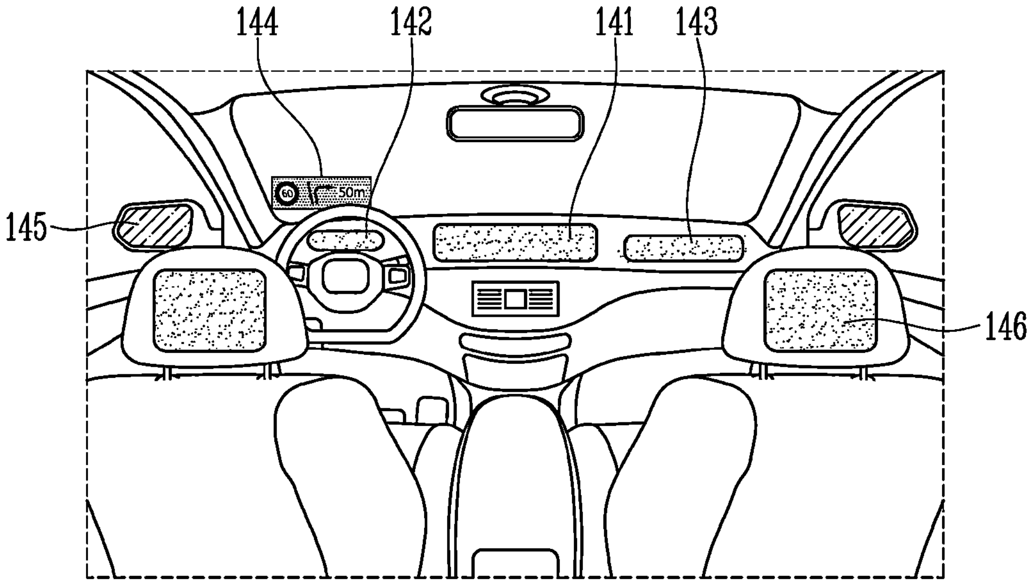

Referring to FIG. 14, the display device to which the pixels in accordance with the above-described embodiments are applied may be applied to an automotive display. In an example, the automotive display may mean an electronic device provided at the inside/outside of a vehicle to provide image data.

For example, the display device to which the pixels in accordance with the above-described embodiments are applied may be applied to at least one of an infortainment panel 141, a cluster 142, a co-driver display 143, a head-up display 144, a side mirror display 145, and a read seat display 146, which are provided in the vehicle.

Figure 15:
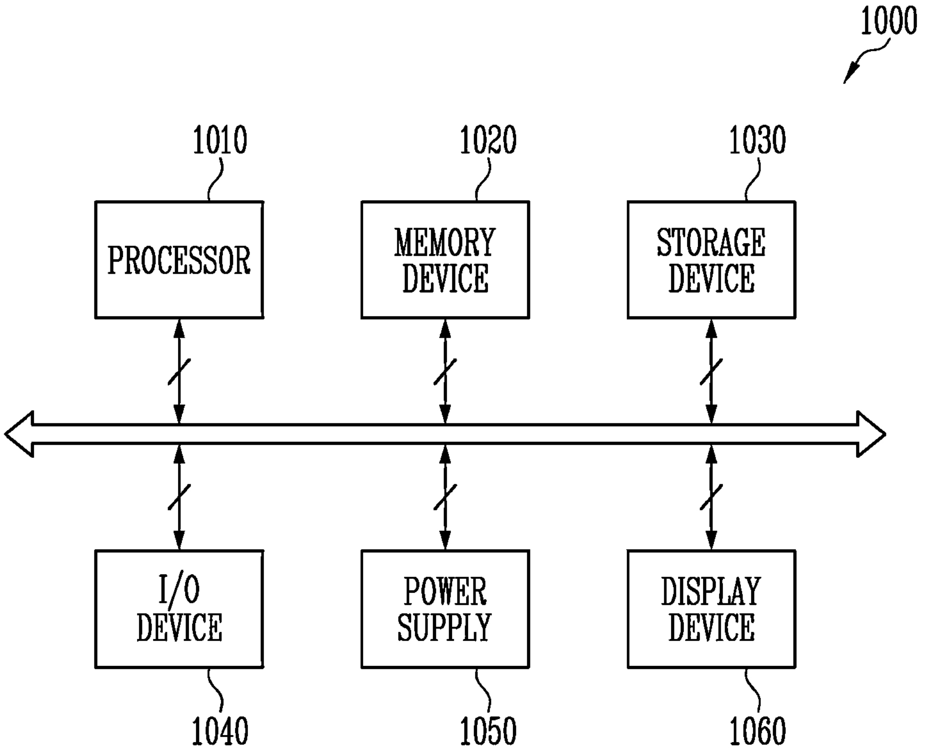
FIG. 15 is a schematic block diagram illustrating an electronic device including a display device in accordance with an embodiment.

FIG. 15 is a schematic block diagram illustrating an electronic device 1000 including a display device in accordance with an embodiment.

Referring to FIGS. 15, the electronic device 1000 may include a processor 1010, a memory device 1020, a storage device 1030, an input/output (I/O) device 1040, a power supply 1050, and a display device 1060. The display device 1060 may be the display device of FIG. 1. The electronic device 1000 may further include various ports for communication with a video card, a sound card, a memory card, a USB device, or other systems.

For example, the electronic device 1000 may be a cellular phone, a video phone, a smart pad, a smartwatch, a navigation device for vehicles, a computer monitor, a laptop computer, a head-mounted display device, or the like.

The processor 1010 may perform specific calculations or tasks. In an embodiment, the processor 1010 may include at least one of a central processing unit, an application processor, a graphic processing unit, a communication processor, an image signal processor, a controller, or the like. The processor 1010 may be connected to other components through an address bus, a control bus, a data bus, and the like. In an embodiment, the processor 1010 may be connected to an expansion bus such as a peripheral component interconnect (PCI) bus. In an embodiment, the processor 1010 may provide input image data to the display device 1060. Hence, the display device 1060 may display an image based on the input image data provided from the processor 1010.

The memory device 1020 may store data needed to perform the operation of the electronic device 1000. The memory device 1020 may function as a working memory and/or a buffer memory for the processor 1010. For example, the memory device 1020 may include one or more volatile memory devices such as a dynamic random access memory (DRAM) device, a static random access memory (SRAM) device, and a mobile DRAM device.

The storage device 1030 may store data in response to control signals or data from the processor 1010. The storage device 1030 may include one or more non-volatile storages to retain the data even when the electronic device 1000 is powered off. In some embodiments, the storage device 1030 may include a solid state drive (SSD), a hard disk drive (HDD), a CD-ROM, or the like.

The I/O device 1040 may include input devices such as a keyboard, a keypad, a touchpad, a touch screen, and a mouse, and output devices such as a speaker and a printer. In an embodiment, the display device 1060 may be integrated with the I/O device 1040.

The power supply 1050 may supply power needed to perform the operation of the electronic device 1000. For example, the power supply 1050 may include a power management integrated circuit (PMIC). In an embodiment, the power supply 1050 may supply power to the display device 1060.

The display device 1060 may display images in response to image data signals and/or control signals from the processor 1010. The display device 1060 may be connected to other components through the buses or other communication links.

In the pixel and the display device including the same in accordance with the present disclosure, a threshold voltage can be compensated using a transistor diode-connected to a source electrode of a driving transistor. Thus, the circuit structure of the pixel can be simplified, and accordingly, the pixel can be applied to a high-resolution panel.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A pixel comprising:

a light emitting element;

a first transistor including a gate electrode connected to a first node, a first electrode connected to a second node, and a second electrode connected to an anode electrode of the light emitting element;

a second transistor connected between a data line and the first node, the second transistor including a gate electrode connected to a first scan line;

a third transistor connected between a first power line and the second node, the third transistor including a gate electrode connected to the second node; and a storage capacitor connected between the first power line and the first node.

2. The pixel of claim 1, wherein the storage capacitor is a Metal-Oxide-Metal (MOM) capacitor, a Metal-Insulator-Metal (MIM) capacitor, or a Metal-Oxide-Semiconductor (MOS) capacitor.

3. The pixel of claim 1, wherein a cathode electrode of the light emitting element is connected to a second power line to which a second driving power source having a voltage lower than a voltage of a first driving power source is supplied.

4. The pixel of claim 1, further comprising:

a fourth transistor connected between the first power line and the third transistor, the fourth transistor including a gate electrode connected to an emission control line; and a fifth transistor connected between the anode electrode of the light emitting element and a third power line to which an initialization power source is supplied, the fifth transistor including a gate electrode connected to a second scan line.

5. The pixel of claim 4, wherein each of the first transistor, the second transistor, the third transistor, the fourth transistor, and the fifth transistor is a P-type transistor.

6. The pixel of claim 4, wherein a high voltage supplied to the emission control line is different from a high voltage supplied to any of the first scan line and the second scan line.

7. The pixel of claim 6, wherein the high voltage supplied to the emission control line is set as a voltage lower than the high voltage supplied to any of the first scan line and the second scan line.

8. The pixel of claim 4, wherein each of the first transistor, the second transistor, and the fifth transistor is a high voltage MOSFET, and each of the third transistor and the fourth transistor is a medium voltage MOSFET.

9. A display device comprising:

pixels connected to scan lines and data lines;

a scan driver configured to drive the scan lines; and a data driver configured to drive the data lines, wherein at least one pixel among the pixels includes:

a light emitting element;

a first transistor including a gate electrode connected to a first node, a first electrode connected to a second node, and a second electrode connected to an anode electrode of the light emitting element;

a second transistor connected between the first node and a corresponding data line of the data lines, the second transistor including a gate electrode connected to a first scan line of the scan lines;

a third transistor connected between a first power line and the second node, the third transistor including a gate electrode connected to the second node; and a storage capacitor connected between the first power line and the first node.

10. The display device of claim 9, wherein the storage capacitor is a Metal-Oxide-Metal (MOM) capacitor, a Metal-Insulator-Metal (MIM) capacitor, or a Metal-Oxide-Semiconductor (MOS) capacitor.

11. The display device of claim 9, wherein a cathode electrode of the light emitting element is connected to a second power line to which a second driving power source having a voltage lower than a voltage of a first driving power source is supplied.

12. The display device of claim 9, further comprising:

emission control lines connected to the pixels; and an emission driver configured to drive the emission control lines, wherein the at least one pixel further includes:

a fourth transistor connected between the first power line and the third transistor, the fourth transistor including a gate electrode connected to a corresponding emission control line of the emission control lines; and a fifth transistor connected between the anode electrode of the light emitting element and a third power line to which an initialization power source is supplied, the fifth transistor including a gate electrode connected to a second scan line of the scan lines.

13. The display device of claim 12, wherein each of the first transistor, the second transistor, the third transistor, the fourth transistor, and the fifth transistor is a P-type transistor.

14. The display device of claim 12, wherein a high voltage supplied to the corresponding emission control line is different from a high voltage supplied to any of the first scan line and the second scan line.

15. The display device of claim 14, wherein the high voltage supplied to the emission control line is set as a voltage lower than the high voltage supplied to any of the first scan line and the second scan line.

16. The display device of claim 12, wherein each of the first transistor, the second transistor, and the fifth transistor is a high voltage MOSFET, and each of the third transistor and the fourth transistor is a medium voltage MOSFET.

17. The display device of claim 12, wherein the at least one pixel is sequentially driven in an initialization period, a writing period, a stabilization period, and an emission period, wherein the emission driver supplies a disable emission control signal to the corresponding emission control line such that the fourth transistor is turned off during the writing period and a partial period of the stabilization period, wherein the scan driver supplies an enable first scan signal to the first scan line such that the second transistor is turned on during the initialization period and the writing period, wherein the scan driver supplies an enable second scan signal to the second scan line such that the fifth transistor is turned on during the initialization period, the writing period, and the stabilization period, and wherein the data driver supplies a data signal to the specific data line during the writing period, and supplies a voltage of a reference power source during the initialization, the stabilization, and the emission periods.

18. The display device of claim 12, wherein the at least one pixel is sequentially driven in an initialization period, a writing period, a stabilization period, and an emission period, wherein the emission driver supplies a disable emission control signal to the corresponding emission control line such that the fourth transistor is turned off during the writing period and a partial period of the stabilization period, wherein the scan driver supplies an enable first scan signal to the first scan line such that the second transistor is turned on during the initialization period and the writing period, wherein the scan driver supplies an enable second scan signal to the second scan line such that the fifth transistor is turned on during the initialization period, the writing period, and the stabilization period, and wherein the data driver supplies a data signal to the corresponding data line during the initialization period and the writing period.

19. An electronic device, comprising:

a processor to provide input image data;

a display device to display an image based on the input image data; and wherein the display device comprising:

pixels connected to scan lines and data lines;

a scan driver configured to drive the scan lines; and a data driver configured to drive the data lines, wherein at least one pixel among the pixels includes:

a light emitting element;

a first transistor including a gate electrode connected to a first node, a first electrode connected to a second node, and a second electrode connected to an anode electrode of the light emitting element;

a second transistor connected between the first node and a corresponding data line of the data lines, the second transistor including a gate electrode connected to a first scan line of the scan lines;

a third transistor connected between a first power line and the second node, the third transistor including a gate electrode connected to the second node; and a storage capacitor connected between the first power line and the first node.

* * * * *